(12) United States Patent
Mosis

(10) Patent No.: US 6,766,247 B2
(45) Date of Patent: Jul. 20, 2004

(54) POSITION DETERMINATION METHOD AND NAVIGATION DEVICE

(75) Inventor: Torsten Mosis, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/286,272

(22) Filed: Nov. 2, 2002

(65) Prior Publication Data

US 2003/0069688 A1 Apr. 10, 2003

Related U.S. Application Data

(63) Continuation of application No. PCT/DE01/01443, filed on Apr. 12, 2001.

(30) Foreign Application Priority Data

May 2, 2000 (DE) .......................... 100 21 373

(51) Int. Cl.[7] .............................. G08G 1/09; G05D 3/00
(52) U.S. Cl. .......................... 701/207; 701/72; 340/995; 340/988; 340/990; 342/357; 342/357.14
(58) Field of Search ................................. 701/207, 216, 701/217, 1, 72, 208, 209, 96; 340/990, 995, 435, 903, 988; 342/357, 457, 357.14, 459

(56) References Cited

U.S. PATENT DOCUMENTS

| 4,796,191 | A | | 1/1989 | Honey et al. ............... 364/450 |
|---|---|---|---|---|
| 5,170,165 | A | * | 12/1992 | Iihoshi et al. ............... 340/995 |
| 5,334,986 | A | * | 8/1994 | Fernhout ............... 342/357.14 |
| 5,394,333 | A | * | 2/1995 | Kao ............................. 701/217 |
| 5,436,840 | A | | 7/1995 | Lam et al. ................... 364/449 |
| 5,440,484 | A | * | 8/1995 | Kao ............................. 33/356 |
| 5,512,904 | A | * | 4/1996 | Bennett ....................... 342/357 |
| 5,839,087 | A | * | 11/1998 | Sato ............................ 701/207 |
| 6,163,749 | A | * | 12/2000 | McDonough et al. ........ 701/208 |
| 6,230,083 | B1 | * | 5/2001 | Matsuda et al. .............. 701/1 |
| 6,230,093 | B1 | * | 5/2001 | Michi et al. .................. 701/96 |
| 6,381,536 | B1 | * | 4/2002 | Satoh et al. ................. 701/208 |
| 2002/0128752 | A1 | * | 9/2002 | Joshi ............................. 701/1 |

FOREIGN PATENT DOCUMENTS

| EP | 0276366 | 8/1988 | .......... G01C/21/22 |
|---|---|---|---|
| EP | 0393935 | 10/1990 | .......... G01C/21/20 |
| EP | 0471405 | 2/2002 | .......... G01C/21/20 |
| GB | 2126040 | 3/1984 | .......... G01S/5/02 |
| WO | 01/84081 | 11/2001 | .......... G01C/21/18 |

OTHER PUBLICATIONS

Preliminary International Search Report for PCT/DE01/01443 5 pages, Feb. 25, 2002.
International Search Report for PCT/DE01/01443 7 pages, Aug. 9, 2001.

* cited by examiner

*Primary Examiner*—Thomas G. Black
*Assistant Examiner*—Tuan C To
(74) *Attorney, Agent, or Firm*—Baker Botts L.L.P.

(57) ABSTRACT

In the case of a position determination method, during traversal of a curve (K) the centroid ($C_d$) of the latter is determined from measured values of a direction sensor. The centroid ($C_m$) of the curve (K) of a digitized road (511) is determined from the alignment of road segments (S) of the digitized road which correspond to positions ($P_d$) determined by dead reckoning. The positions determined by dead reckoning are corrected on the basis of the difference between the determined curve centroids ($C_d$; $C_m$).

18 Claims, 3 Drawing Sheets

POSITION DETERMINATION METHOD AND NAVIGATION DEVICE

CROSS REFERENCE TO RELATED APPLICATIONS

This application is a continuation of International Application No. PCT/DE01/01443 filed Apr. 12, 2001, which designates the United States, and claims priority to German application number DE10021373.1 filed May 2, 2000.

BACKGROUND OF THE INVENTION

The invention relates to a position determination method operating by means of adjustment of a position determined by dead reckoning with the aid of a digital road map, and to a navigation device.

Patent specification U.S. Pat. No. 4,796,191 discloses correcting a position determined by dead reckoning by comparison with roads of a digital road map. For this purpose, a comparison is carried out between a direction traveled by a vehicle and the direction of roads of a digital road map. As a result of adjusting with the aid of the digital road map, a summation of the measurement errors occurring in the sensors is prevented.

Furthermore, a vehicle navigation system that uses dead reckoning and satellite navigation (GPS) for position determination is known from patent U.S. Pat. No. 5,394,333. A position calculated by dead reckoning is plotted on a road map. A correction value for the GPS navigation is determined from the difference between the position on the road map and a position found by means of GPS.

However, position can be determined on the digital road map in an informative way only in the event of a significant change in direction of the vehicle, for example during a turning-off maneuver.

SUMMARY OF THE INVENTION

It is an object of the invention to provide a position determination method and a navigation device which can determine a precise position on a digital road map even in the event of a slight change in direction.

This aim is achieved by a position determination method operating by means of adjustment of a position determined by dead reckoning with the aid of a digital road map, comprising the following steps:

a succession of positions determined by dead reckoning is tracked on digitized roads of the digital road map and assigned to road segments of the digital road map, during traversal of a curve the centroid of the curve is determined from measured values of a direction sensor, the centroid of the curve of a digitized road is determined from the alignment of road segments of the digitized road which corresponds to the determined positions, and the position determined by dead reckoning is corrected on the basis of the difference between the determined curve centroids.

The centroid of the curve recorded in the digital road map can be calculated by weighting differences in the angles of consecutive road segments in their succession and adding them, and dividing the sum thus determined by the sum of the differences in the angles of the consecutive road segments. The differences in the angles can be determined from shape points that define the road segments of the curve, and in that the differences in the angles are weighted with the time interval that has elapsed during tracking of the road segments on the digital road map. The average speed during traversal of the curve is determined, and in that the time interval between the traversal of the curve centroids is multiplied by the average speed in order to correct the position, determined by dead reckoning, with the distance thus obtained.

Another position determination method according to the present invention comprises the steps:

tracking a plurality of positions by dead reckoning on digitized roads of a digital road map and assigning the positions to road segments of the digital road map, determining the centroid of a curve from measured values of a direction sensor while traveling along the curve, determining a digital centroid of the curve of a digitized road from the alignment of road segments of the digitized road which corresponds to the determined positions, and correcting the position determined by dead reckoning on the basis of the difference between the determined curve centroid and digital curve centroid.

The centroid of the curve recorded in the digital road map can be calculated by weighting differences in the angles of consecutive road segments in their succession and adding them, and dividing the sum thus determined by the sum of the differences in the angles of the consecutive road segments. The differences in the angles can be determined from shape points that define the road segments of the curve, and the differences in the angles can be weighted with the time interval that has elapsed during tracking of the road segments on the digital road map. The average speed during traversal of the curve can be determined, and the time interval between the traversal of the curve centroids can be multiplied by the average speed in order to correct the position, determined by dead reckoning, with the distance thus obtained. A curve can be defined in the digitized road by shape points. The centroid of the curve can also be determined by obtaining the individual changes in direction from consecutive direction measurements and by weighting and adding the changes with the elapsed time and by dividing the weighted and added changes by the sum of the measured changes in direction. The digital centroid of the curve recorded in the digital road map can be determined by weighting and adding the differences in the angles of consecutive road segments in their succession with the respectively elapsed time which has elapsed during tracking of the road segments on the digital road map and by dividing the sum by the sum of the differences in the angles of the consecutive road segments.

An embodiment according to the present invention is a navigation device which comprises a distance sensor, a direction sensor, a map memory for a digital road map, and at least one processor for dead reckoning, which is connected to the distance sensor, the direction sensor and the map memory, which during traversal of a curve determines the centroid of the latter from measured values of the direction sensor, which determines the centroid of the curve of the digitized road from the alignment of road segments of a digitized road which corresponds to the determined positions and which corrects the position determined by dead reckoning on the basis of the difference between the determined curve centroids.

The direction sensor can be a gyroscope. The navigation device can further comprise a satellite receiver for operating as a distance and direction sensor and a display for displaying the determined position on the digitized map.

Centroids are determined for a curve that traverses a road and whose course is determined by means of dead reckoning, and for a corresponding curve on a road of a digital road map. The curve centroids are points which are also defined in the case of lengthy curves and are available for an adjustment of the position, measured by dead reckoning, with the aid of the digital road map. Such lengthy curves typically have a radius of 500 m to 1000 m.

A time measurement or a distance measurement can serve as a basis for determining the curve centroids on the map.

If a time measurement serves as a basis for determining the curve centroids, the average speed during traversal of the curve is advantageously used for the position correction.

BRIEF DESCRIPTION OF THE DRAWINGS

Further advantages, features and possible applications of the invention emerge from the following description of exemplary embodiments in conjunction with the drawings, in which.

DETAILED DESCRIPTION OF THE PREFERRED EMBODIMENTS

Figure 1:
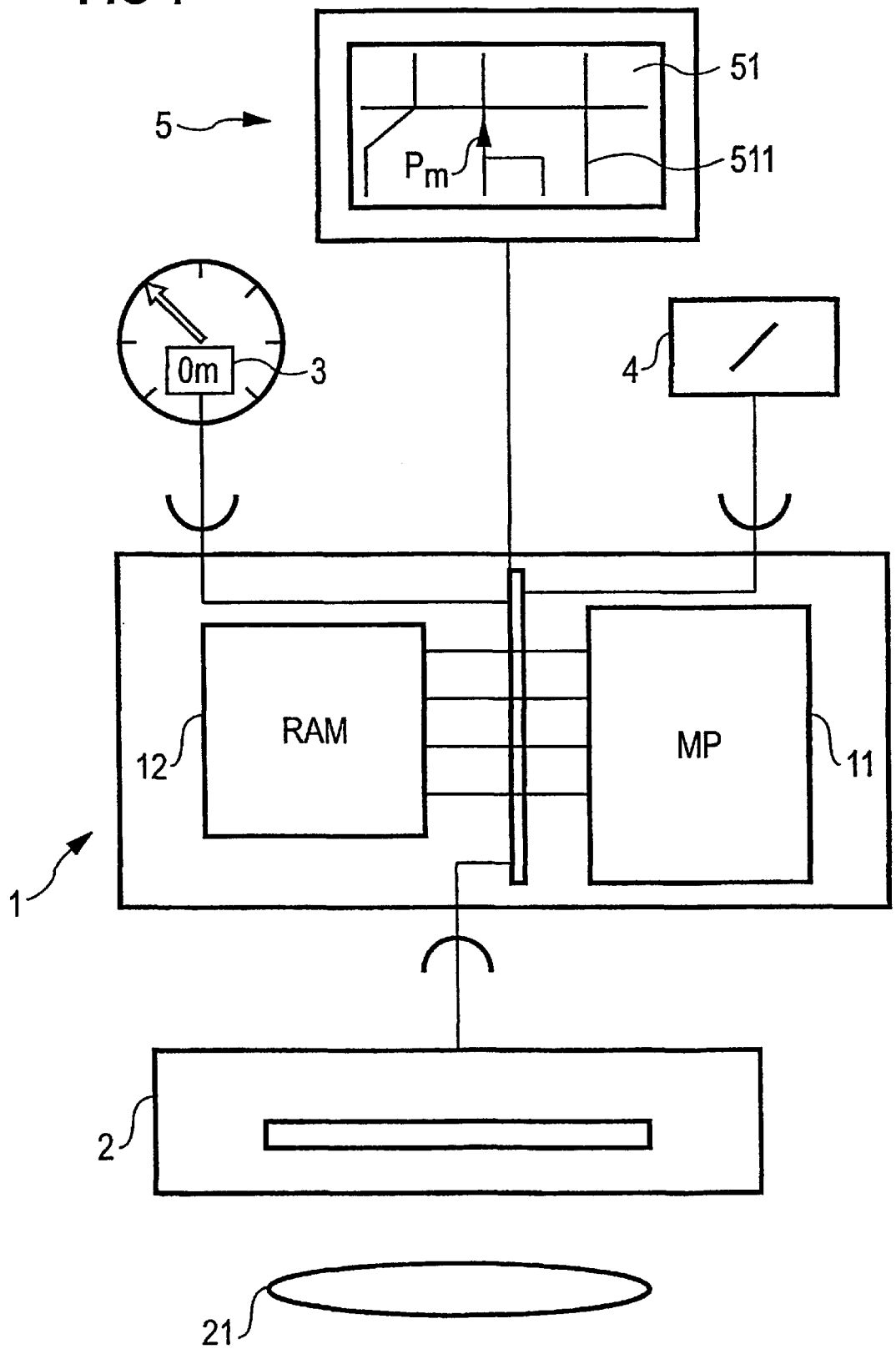
FIG. 1 shows a vehicle navigation system.

FIG. 1 shows an autonomous navigation system 1 used in a motor vehicle. Said system has a computer or a processor 11 with a main memory 12.

The processor 11 has access to a drive 2 for a map memory 21 designed as a DVD (Digital Versatile Disk). A database in the form of a digital road map 51 is stored on this storage medium.

Furthermore, the processor 11 is connected to a distance sensor 3, which is an odometer (tachometer), and to a direction sensor 4. The direction sensor 4 is a gyroscope.

The processor 11 is additionally connected to a satellite receiver (not illustrated). The signals of said receiver are likewise used for determining position. The satellite receiver can also take over the task of the distance sensor 3 and the direction sensor 4 on its own.

The processor 11 calculates a vehicle position on the basis of the [lacuna] from the sensors and the map memory 21, and outputs said position to a display device 5 in the form of an arrow symbol. The vehicle position is displayed on a digitized road 511 of the digital road map 51.

Figure 2:
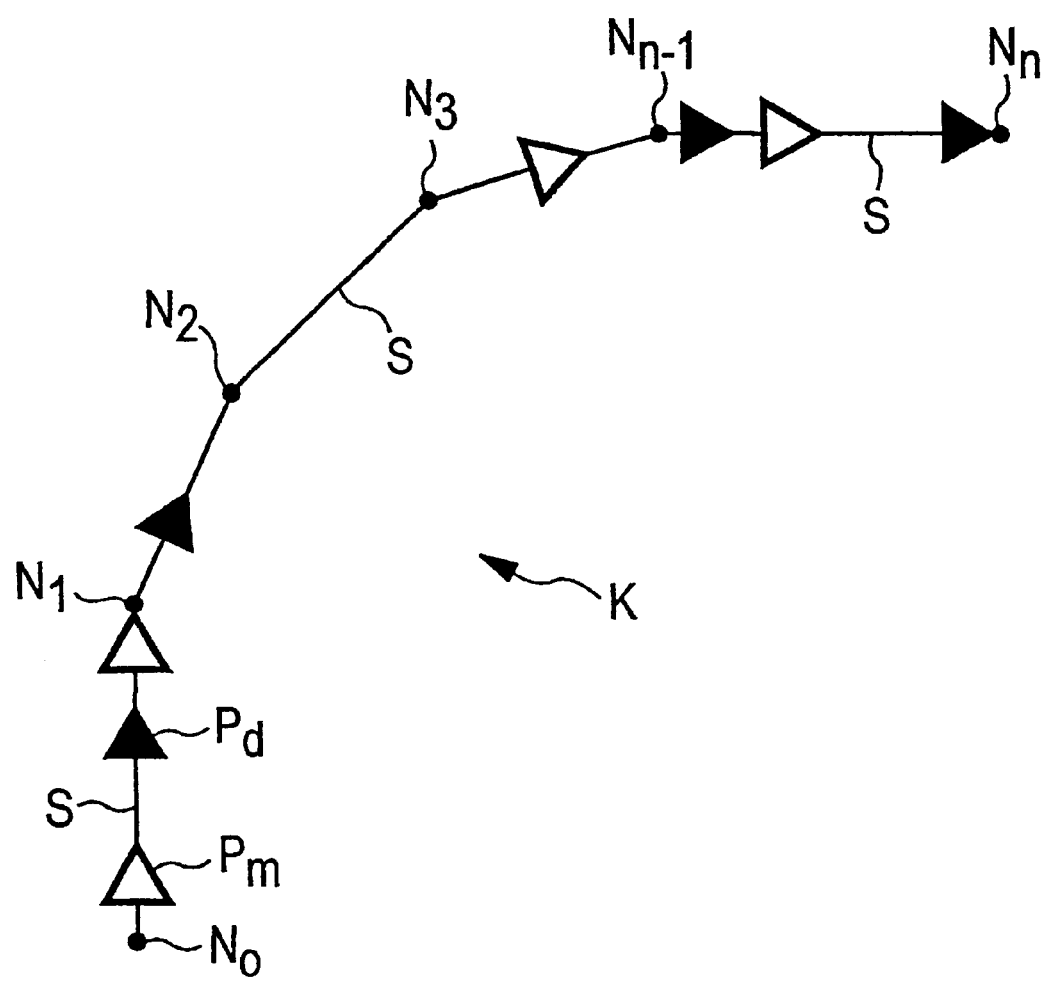
FIG. 2 shows a curve recorded in a digital road map.

Illustrated in FIG. 2 is a lengthy curve K which is stored in the digital road map and has a radius 750 m. This curve K is a segment of a digitized road that is defined by nodes. These nodes describe regular intersections and contain data on the distance and the direction to the next node. Courses of curves are likewise defined by consecutive nodes. The latter are denoted in general as shape points.

The course of the curve illustrated is defined by the shape points $N_0$ to $N_n$. A road segment S extends in each case between two nodes or shape points.

A plurality of vehicle positions during driving along the curve are entered on the curve K. Here $P_d$ denotes a position determined by dead reckoning on the basis of distance measurements and direction measurements on the digital road map, and $P_m$ denotes an actual, real position that is initially unknown to the navigation device.

It follows from the illustration that the calculated position Pd is taken to be in front of the real position $P_m$ because of a length error. At a first instant, the two positions $P_d$ and $P_m$ are located on the road segment S between the shape points $N_0$ and $N_1$. At a second instant, the vehicle is still located in reality in the same road segment S while, according to the erroneous length measurement, the vehicle would already have described a curved course between the shape points $N_1$ and $N_2$. At the end of the curve K the vehicle is still located in reality on the curve, while according to the distance measured by the distance meter the vehicle would already have had to leave the curve.

The course of the curve has no significant change in direction within a few meters, and so it is not possible to make a unique assignment of a point on the measured, traversed curve to a point on the digitized curve of the digital road map. However, on the basis of a comparison between the changes in angle output by the direction sensor and the alignment of the road segments S, it is possible to establish whether the position $P_d$ calculated by the navigation device leads or lags the true position.

In order nevertheless to undertake a unique punctiform assignment between the measured path and the digital road map, the curve centroid of the measured path is determined from the measured values of the sensors, and the curve centroid of the curve K recorded in the digital road map is determined from the alignment of the road segments S.

Figure 3:
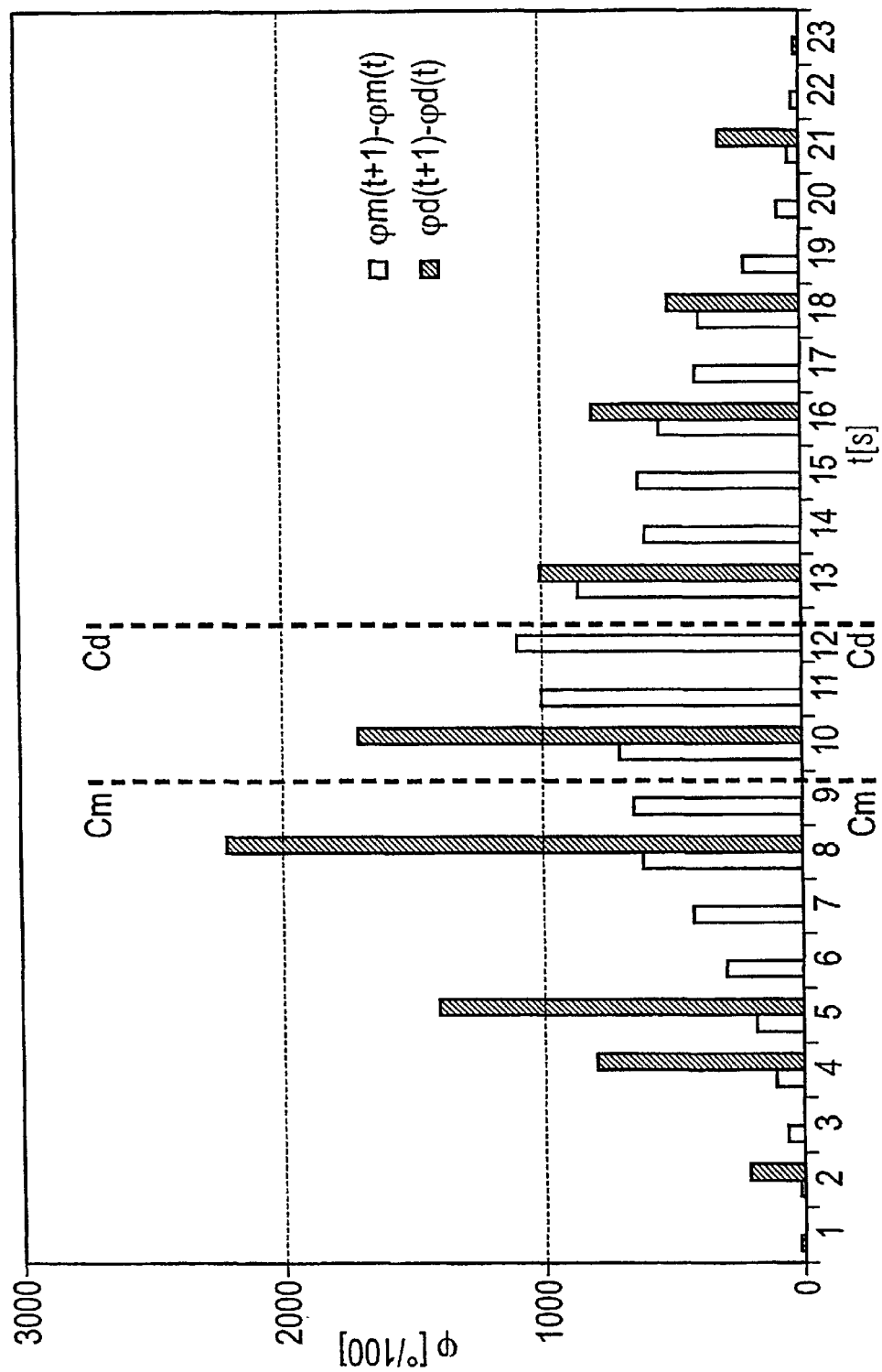
FIG. 3 shows a curve centroid that was determined on the basis of the measured path, and a curve centroid that was determined on the basis of the corresponding curve of the digital road map.

FIG. 3 shows a diagram in which there are plotted above a time axis the discrete changes in angle $\Delta\Phi$ both in accordance with the sensor measured values (white bars) and in accordance with a digital road map. Also plotted are the centroids $C_d$ and $C_m$ for the measured curve and for the digitized curve of the road map.

The curve centroid $C_d$ of the traversed path is determined by virtue of the fact that the individual changes in direction $\Delta\Phi$ are obtained from consecutive direction measurements and in each case weighted with the elapsed time t and added. This sum is then divided by the sum of the measured changes in direction.

The centroid $C_m$ of the curve recorded in the digital road map is determined by virtue of the fact that the differences in the angles $\Delta\Phi$ of consecutive road segments are weighted in their succession with the respectively elapsed time t which has elapsed during tracking of the road segments on the digital road map. The values thus obtained are added. This sum is divided by the sum of the differences in the angles $\Delta\Phi$ of the consecutive road segments.

It holds that:

$$Cd = \frac{\sum_{i=0}^{n} i*(\varphi d, i+1 - \varphi d, i)}{\sum_{i=0}^{n} (\varphi d, i+1 - \varphi d, i)} \text{ and } Cm = \frac{\sum_{i=0}^{n} i*(\varphi m, i+1 - \varphi m, i)}{\sum_{i=0}^{n} (\varphi m, i+1 - \varphi m, i)}$$

in which case:

i is a discrete instant,
n is the number of the discrete instants (curve duration),
$\Phi_{d,i}$ is the measured alignment of the vehicle at the instant i,
$\Phi_{m,i}$ is the alignment of the road segment at the instant i,
$C_d$ is the centroid of the curve traversed by the vehicle, and
$C_m$ is the centroid of the curve of the digitized road.

The curve centroids Cd and Cm, which are instants, are subsequently converted into a path difference or distance with the aid of which the distance measurement is corrected.

Since the speed is frequently not constant during a drive along a curve, use is made for this purpose of an average speed. This is then multiplied by the time interval ($C_d$-$C_m$) between the curve centroids.

The path difference, that is to say the length error or correction value, can be calculated as follows:

$$\delta s = (Cd - Cm) * \frac{\sum_{i=1}^{n} Vi}{n},$$

in which case i is a discrete instant,
n is the number of the discrete instants (curve duration),
$C_d$ is the centroid of the curve traversed by the vehicle,
$C_m$ is the centroid of the curve of the digitized road,
$V_i$ is the speed at the instant i, and
$\delta_s$ is the distance between the measured and the actual position.

If, by contrast, the curve centroids are determined, on the basis of the traversed path measured by the distance sensor, the length error is obtained directly from the difference between the curve centroids.

The calculated distance $\delta_s$ is divided into a plurality of sections and successively added to or subtracted from the position $P_d$ respectively calculated on the basis of the sensor data. As a result, the position $P_d$ is gradually approximated to the actual position $P_m$, and a sudden change in the representation in the display device is avoided.

What is claimed is:

1. A position determination method operating by means of adjustment of a position determined by dead reckoning with the aid of a digital road map, comprising the following steps:
    a succession of positions determined by dead reckoning is tracked on digitized roads of the digital road map and assigned to road segments of the digital road map,
    during traversal of a curve the centroid of the curve is determined from measured values of a direction sensor,
    the centroid of the curve of a digitized road is determined from the alignment of road segments of the digitized road which corresponds to the determined positions, and
    the position determined by dead reckoning is corrected on the basis of the difference between the determined curve centroids, wherein the centroid of the curve recorded in the digital road map is calculated by weighting differences in the angles of consecutive road segments in their succession and adding them, and dividing the sum thus determined by the sum of the differences in the angles of the consecutive road segments.

2. A position determination method operating by means of adjustment of a position determined by dead reckoning with the aid of a digital road map, comprising the following steps:
    a succession of positions determined by dead reckoning is tracked on digitized roads of the digital road map and assigned to road segments of the digital road map,
    during traversal of a curve the centroid of the curve is determined from measured values of a direction sensor,
    the centroid of the curve of a digitized road is determined from the alignment of road segments of the digitized road which corresponds to the determined positions, and
    the position determined by dead reckoning is corrected on the basis of the difference between the determined curve centroids, wherein the differences in the angles are determined from shape points that define the road segments of the curve, and in that the differences in the angles are weighted with the time interval that has elapsed during tracking of the road segments on the digital road map.

3. A position determination method operating by means of adjustment of a position determined by dead reckoning with the aid of a digital road map, comprising the following steps:
    a succession of positions determined by dead reckoning is tracked on digitized roads of the digital road map and assigned to road segments of the digital road map,
    during traversal of a curve the centroid of the curve is determined from measured values of a direction sensor,
    the centroid of the curve of a digitized road is determined from the alignment of road segments of the digitized road which corresponds to the determined positions, and
    the position determined by dead reckoning is corrected on the basis of the difference between the determined curve centroids, wherein the average speed during traversal of the curve is determined, and in that the time interval between the traversal of the curve centroids is multiplied by the average speed in order to correct the position, determined by dead reckoning, with the distance thus obtained.

4. A position determination method operating for a navigation system comprising the steps:
    tracking a plurality of positions by dead reckoning on digitized roads of a digital road map and assigning the positions to road segments of the digital road map,
    determining the centroid of a curve from measured values of a direction sensor while traveling along the curve,
    determining a digital centroid of the curve of a digitized road from the alignment of road segments of the digitized road which corresponds to the determined positions, and
    correcting the position determined by dead reckoning on the basis of the difference between the determined curve centroid and digital curve centroid.

5. The method as claimed in claim 4, wherein the centroid of the curve recorded in the digital road map is calculated by weighting differences in the angles of consecutive road segments in their succession and adding them, and dividing the sum thus determined by the sum of the differences in the angles of the consecutive road segments.

6. The method as claimed in claim 4, wherein the differences in the angles are determined from shape points that define the road segments of the curve, and in that the differences in the angles are weighted with the time interval that has elapsed during tracking of the road segments on the digital road map.

7. The method as claimed in claim 4, wherein the average speed during traversal of the curve is determined, and in that the time interval between the traversal of the curve centroids is multiplied by the average speed in order to correct the position, determined by dead reckoning, with the distance thus obtained.

8. The method as claimed in claim 4, wherein a curve is defined in the digitized road by shape points.

9. The method as claimed in claim 4, wherein the centroid of the curve is determined by obtaining the individual changes in direction from consecutive direction measurements and by weighting and adding the changes with the elapsed time and by dividing the weighted and added changes by the sum of the measured changes in direction.

10. The method as claimed in claim 4, wherein the digital centroid of the curve recorded in the digital road map is determined by weighting and adding the differences in the angles of consecutive road segments in their succession with the respectively elapsed time which has elapsed during tracking of the road segments on the digital road map and by dividing the sum by the sum of the differences in the angles of the consecutive road segments.

11. A navigation device comprising:
   a distance sensor,
   a direction sensor,
   a map memory for a digital road map, and
   at least one processor for dead reckoning, which is connected to the distance sensor, the direction sensor and the map memory,
      which during traversal of a curve determines the centroid of the latter from measured values of the direction sensor,
      which determines the centroid of the curve of the digitized road from the alignment of road segments of a digitized road which corresponds to the determined positions and which corrects the position determined by dead reckoning on the basis of the difference between the determined curve centroids.

12. The navigation device as in claim 11, wherein the direction sensor is a gyroscope.

13. The navigation device as in claim 11, further comprising a satellite receiver for operating as a distance and direction sensor.

14. The navigation device as in claim 11, further comprising a display for displaying the determined position on the digitized map.

15. A position determination method for correcting a position determined by dead reckoning with the aid of a digital road map, comprising the steps of:

tracking a succession of positions determined by dead reckoning on digitized roads of the digital road map and assigning determined positions road segments of the digital road map, during traversal of a curve, calculating a centroid of the curve from measured values of a direction sensor;

calculating a centroid of the curve of a digitized road from the alignment of road segments of the digitized road which corresponds to the determined positions; and correcting the position determined by dead reckoning is corrected on the basis of the difference between the calculated curve centroids.

16. The method of claim 15, wherein the step of calculating the centroid of the curve recorded in the digital road map further comprising determining by weighting differences in the angles of consecutive road segments in their succession and adding them, and dividing the sum thus determined by the sum of the differences in the angles of the consecutive road segments.

17. The method of claim 16, further comprising determining the differences in the angles from shape points that define the road segments of the curve, and in that the differences in the angles are weighted with the time interval that has elapsed during tracking of the road segments on the digital road map.

18. The method of claim 15, further comprising:
   determining an average speed during traversal of the curve; and
   during the time interval between the traversal of the curve, multiplying the calculated curve centroids by the average speed in order to correct the position determined by dead reckoning with the distance thus obtained.

* * * * *